United States Patent [19]

Mallis

[11] Patent Number: 5,794,985

[45] Date of Patent: Aug. 18, 1998

[54] THREADED PIPE CONNECTION

[75] Inventor: David L. Mallis, The Woodlands, Tex.

[73] Assignee: Hydril Company, Houston, Tex.

[21] Appl. No.: 759,288

[22] Filed: Dec. 2, 1996

Related U.S. Application Data

[63] Continuation of Ser. No. 409,330, Mar. 23, 1995, abandoned.

[51] Int. Cl.$^6$ ............................................. F16L 35/00
[52] U.S. Cl. ........................... 285/93; 285/330; 285/334
[58] Field of Search ................................. 285/93, 333, 334, 285/355, 913, 330, 383

[56] References Cited

U.S. PATENT DOCUMENTS

| | | | |
|---|---|---|---|
| 1,054,812 | 3/1913 | Zierath | 285/913 X |
| 1,781,091 | 11/1930 | Wilson . | |
| 2,296,198 | 9/1942 | Boynton | 285/334 X |
| 2,380,690 | 7/1945 | Graham | 285/333 X |
| 2,464,744 | 3/1949 | Fennema | 285/135 |
| 3,468,563 | 9/1969 | Duret | 285/93 |
| 3,476,409 | 11/1969 | Benteler et al. | 285/40 |
| 4,317,585 | 3/1982 | Boice | 285/93 |
| 4,537,428 | 8/1985 | Landriault | 285/333 |
| 4,712,815 | 12/1987 | Reeves | 285/334 |
| 4,762,344 | 8/1988 | Perkins et al. | 285/175 |
| 4,813,497 | 3/1989 | Wenzel | 285/93 X |
| 4,962,579 | 10/1990 | Moyer et al. | 285/93 X |
| 5,040,827 | 8/1991 | Delange | 285/93 X |
| 5,048,871 | 9/1991 | Pfeiffer et al. | 285/333 X |
| 5,474,334 | 12/1995 | Eppink | 285/333 X |
| 5,609,440 | 3/1997 | Roche | 285/330 X |

FOREIGN PATENT DOCUMENTS 392878  7/1923  Germany .

OTHER PUBLICATIONS

Offshore Technology Conference Paper OTC 4514 "Differential Thread Riser Coupling for TP and Platform Tieback Applications", 1983.

*Primary Examiner*—Terry Lee Melius
*Assistant Examiner*—Heather Shackelford
*Attorney, Agent, or Firm*—Vaden, Eickenroht & Thompson, L.L.P.

[57] ABSTRACT

A threaded pipe connection is disclosed for connecting two joints of pipe having externally threaded pin members, one pin member having external right-hand threads and the other pin member having left-hand threads. An internally threaded coupling having right and left-hand threads that mates with the threads on the pin members. An internal pressure seal ring is positioned to provide a seal between the ends of the pin members. A plurality of mating lugs and grooves on the ends of the pin members hold the pins from relative rotation when the connection is being made up. A metal-to-metal seal located between each pin member and the coupling adjacent each end of the coupling isolates the threads of the connection from the ambient environment thus sealing off the pipe annulus from external pressure due to hydrostatic head. Indicia such as engaging surfaces or aligned scribe lines on the pin members ensure that the sealing surfaces on the coupling and the pin members that form the external seals are positioned to properly engage and form seals when the connection is made up.

9 Claims, 2 Drawing Sheets

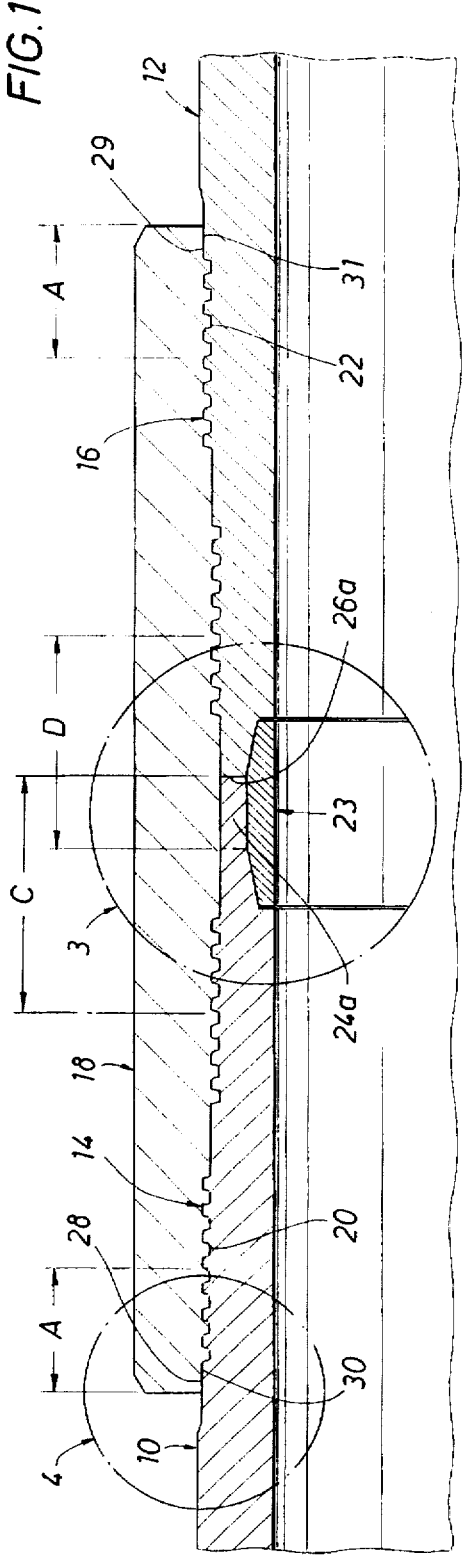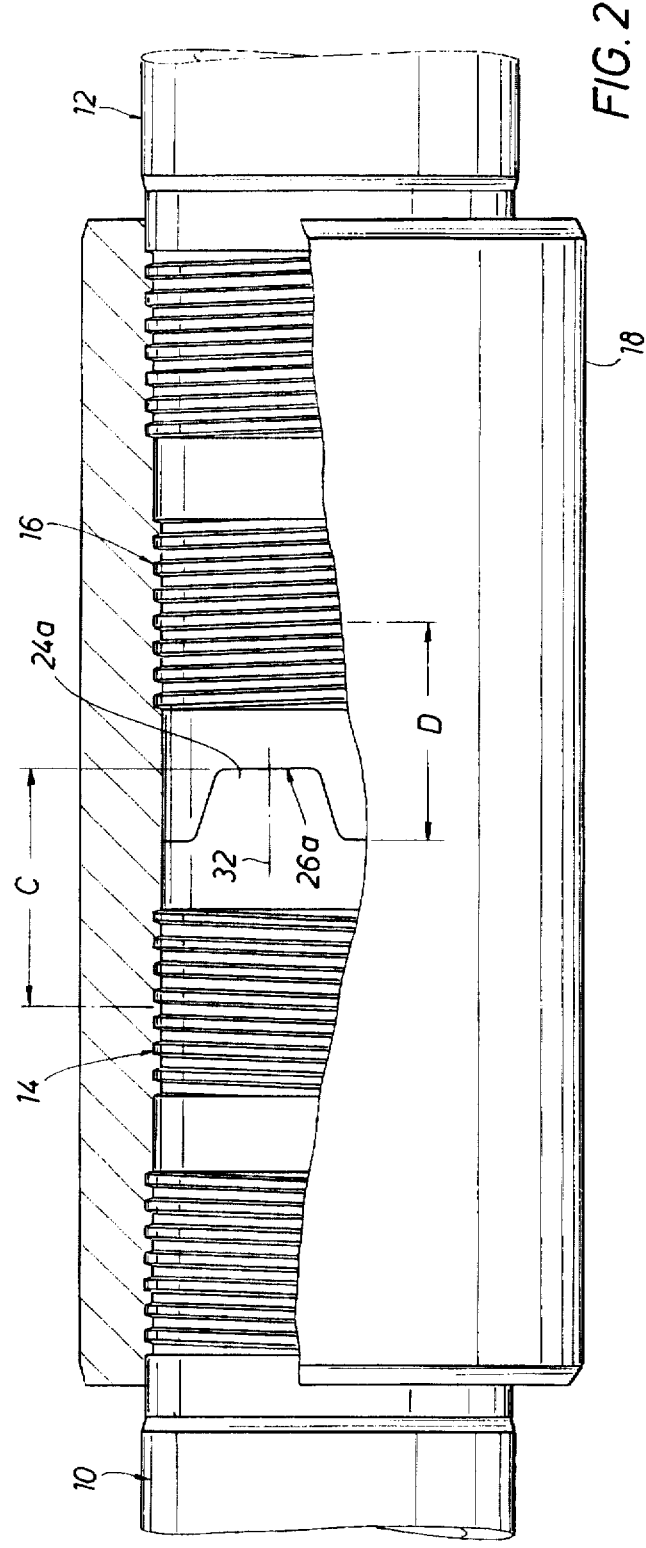

THREADED PIPE CONNECTION

This application is a continuation of application Ser. No. 08/409,330, filed Mar. 23, 1995, now abandoned.

This invention relates to threaded and coupled pipe connections generally and in particular to a threaded and coupled connection where the coupling can be made up on the threaded ends of the pipe generally referred to as "pin members" by rotating the coupling relative to the pins.

Final makeup of this connection can only occur by rotating the coupling with both pin members properly aligned and fixed to prevent their rotation. The connection can be preliminarily made up in a conventional manner prior to lug engagement by making up the coupling on one pin member a predetermined number of turns and then making up the other pin member into the opposite end of the coupling the same number of predetermined turns. Nevertheless, final makeup must occur in the manner described above. Generally, the connection will be made up by initially stabbing both pin members into the coupling, aligning them in accordance with the indicia on the pin members, fixing them to prevent rotation, and rotating the coupling to final makeup.

Specifically, the connection to which this invention is directed has right and left-hand threads on the pin members and the coupling has mating right and left-hand threads so that the coupling can be rotated in one direction and make up the coupling on each pin member simultaneously. An internal seal is actuated when the connection is made up.

It is contemplated that this type connection will be used mostly on underwater pipelines, risers, and offshore conductor pipe which places the connection underwater in each instance. No provision has been made to protect the threads from the water and it is the object of this invention to provide metal-to-metal seals between the coupling and the pins to protect the threads from the corrosive effects of sea water as well as protecting the internal seal and annulus of the pipe from the adverse effects of external pressure due to hydrostatic head. For the two external seals to properly seat, the free-floating coupling must be accurately centered over the mating pin members axially so that a uniform normal force will exist between the sealing surfaces of the external seal at both ends of the coupling.

It is a feature and object of this invention to provide threads at each end of the coupling that are accurately times to each other. Specifically, it is a feature and object of this invention to provide a timing lug on one pin member and a timing groove on the other pin member that are each accurately times to the adjacent pin threads so that when the pin members are drawn together by rotating the coupling in a manner that mates the timing lug and the timing groove, all the threads will be in phase and the coupling will actually float to the center of the connector thereby properly energizing the external seals.

These and other objects, advantages, and features of this invention will be apparent to those skilled in the art from a consideration of the specification including the attached drawings and appended claims.

In the Drawings

FIG. 1 is a partial sectional view of the threaded connection of this invention will the coupling made up on the two abutting threaded pin members.

FIG. 2 is a top view of the connection of FIG. 1 rotated 90° with the coupling broken away to show the engagement of the timing groove and timing lug of this invention.

Figure 3:
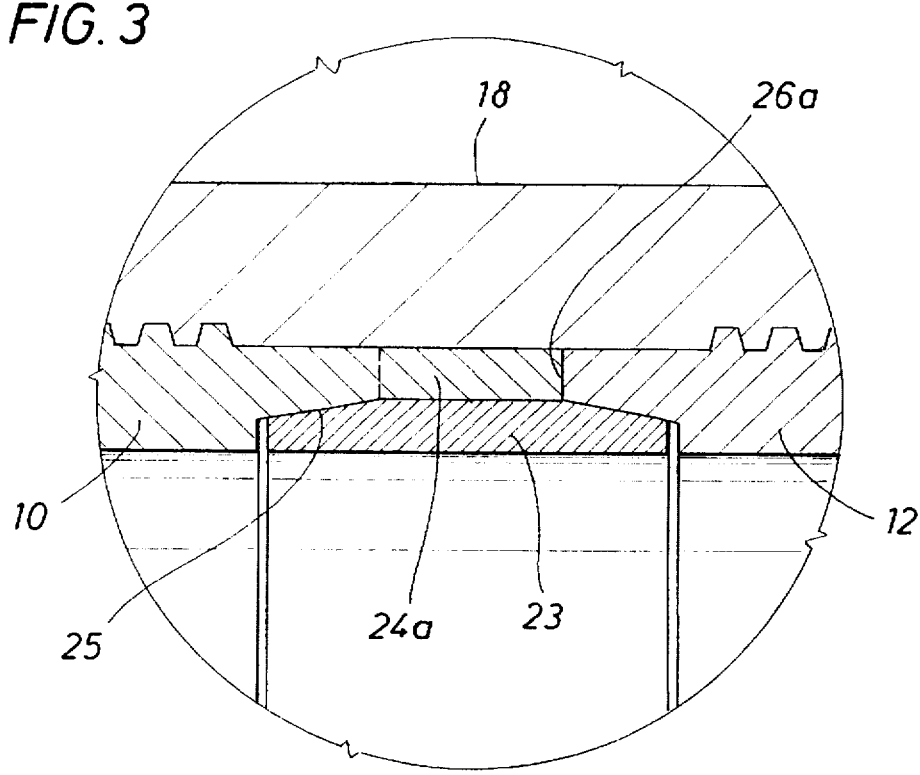
FIG. 3 is an enlarged view of the internal seal shown in circle 3 of FIG. 1.

Threaded pin members 10 and 12 are provided with two step, right and left threads 14 and 16. Coupling 18 has mating two step threads 20 and 22 on opposite sides of the center line of the coupling that mate with threads 14 and 16 on the pin members 10 and 12. When the coupling is made up on the pin members, as shown in FIG. 1, the ends of the pin members have a plurality of lugs that mate when the connection is made up as shown in FIG. 2 where lug 24a is shown in engagement with groove 26a.

As shown in FIGS. 1 and 3, the abutting ends of the pin members are machined to form cavity 25 to receive annular seal member 23.

Figure 4:
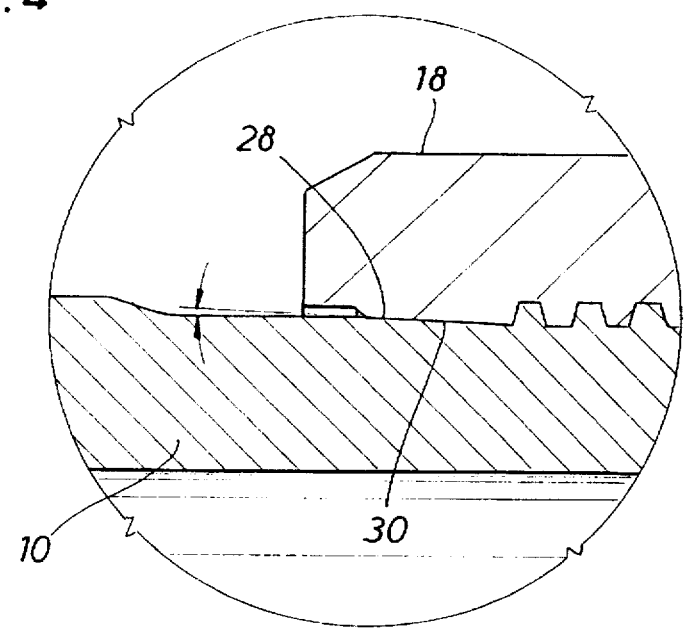
FIG. 4 is a view on an enlarged scale of the metal-to-metal external seal in circle 4 of FIG. 1.

In accordance with this invention, external conical surfaces 28 and 29 on the pin members engage conical sealing surfaces 30 and 31 on the coupling to form metal-to-metal seals when the connection is made up. These seals prevent ambient seal water from reaching the mating threads of the connection thus sealing of the pipe annulus from external pressure due to hydrostatic head. One such external seal in this connection is shown on an enlarged scale in FIG. 4 where tapered surface 28 on the pin engages tapered surface 30 on the coupling.

Since the coupling is free-floating, indicia on the pins such as scribe lines or other marks or engaging surfaces on the pin members are provided to ensure that the coupling is accurately positioned to engage sealing surfaces 28 and 30 with substantially equal normal forces. In the embodiment shown, engaging surfaces such as lug 24a and groove 26a on the pin members are used to position the sealing surfaces for proper engagement. These are referred to as the "timing" lug and the "timing" groove. In this embodiment, lug 24a and groove 26a are positively identified to allow for proper alignment prior to engagement.

The timing lug and timing groove are positioned relative to the threads so that when the connection is made up with the timing lug and groove in engagement, the coupling will be centered relative to the pin members. To accomplish this, any point on the righthand threads on the coupling is the same distance from the coupling face as the corresponding point on the left-hand threads measured parallel to the longitudinal axis of the coupling. This is shown, for example, in FIG. 1 by dimensions A at each end of the coupling, which are equal and are measured from the load flank and thread crest intersect of the fourth thread on the coupling to the face of the coupling. Any thread can be used as long as the same thread is used on both ends. In addition, one pin member is provided with a point on a thread located a given distance from the pin nose in an axial plane centered on the timing lug. This is dimension C. The other pin member is provided with a corresponding point on a thread located a given distance from the pin nose in an axial plane centered in the timing groove. This is dimension D. The center line of the timing groove and the center line of the timing lug, of course, coincide as shown by center line 32 in FIG. 2.

With this arrangement, the proper procedure for making up the connection is to stab the pin members in opposite ends of the coupling with the timing groove and timing lug in approximate alignment and rotating the coupling to pull the pin members into the coupling until the timing lug and timing groove engage. Coupling 12 is now positioned for the sealing surfaces 28 and 30 on the pin members and sealing surfaces 30 and 31 on the coupling to engage and provide external seals to isolate the threads form the ambient conditions.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. A threaded pipe connection for connecting two joints of pipe having externally threaded pin ends, said connection comprising external cylindrical, right-hand threads on one pin end and external, cylindrical, left-hand threads on the other pin, an internally threaded coupling having right and left-hand cylindrical threads for mating with the threads on the pins, said threads on the pins and coupling having the same pitch, an internal pressure seal ring positioned to provide a seal between the ends of the pins, and a plurality of mating, fully engaged lugs and grooves or the ends of the pins to hold the pins from relative rotation when the connection is made up, an annular sealing surface on each pin on the opposite side of the threads from the lugs and grooves and annular sealing surfaces on the inside surface of the coupling between the ends of the coupling and the threads to engage the sealing surfaces on the pins to form external metal-to-metal seals between each pin and the coupling adjacent each end of the coupling to isolate the threads of the connection from the ambient environment and means for allowing the coupling to float to the center of the connection to energize the external seals when the pins and lugs are properly aligned and the threads are in phase, said means including indicia on the pins for positioning the pin members to ensure that the threads are accurately timed so the threads on the pins and the threads on the coupling will be in phase and the coupling will float to the center of the connection and energize the external seals.

2. The threaded connection of claim 1 in which the indicia on the pin members are a timing lug and a timing groove on the ends of the pins.

3. The threaded connection of claim 1 in which any point on the right-hand threads of the coupling is the same distance from the coupling face as the same corresponding point on the left-hand threads of the coupling measured parallel to the longitudinal axis of the coupling when the connection is made up.

4. The threaded connection of claim 1 in which the engaging surfaces are a lug and a groove, the load blanks of the right and left-hand coupling threads are equidistant from the coupling face in any plane extending along the longitudinal axis of the coupling, and in which the load blank of the threads on each pin are located the same distance from the ends of the pins along the same longitudinal axis.

5. A threaded connection comprising axially aligned pipe joints, one pipe joint having a threaded pin with cylindrical, right-hand, external threads and the other pipe joint having a threaded pin with cylindrical, left-hand, external threads, a coupling having cylindrical, right-hand, internal threads and cylindrical, left-hand, internal threads for mating with the threads on the threaded pins and connect the pipe joints in axial alignment, said threads on the pins and coupling having the same pitch, metal-to-metal conical external seals located at each end of the coupling between the end of the coupling and the threads to engage the pipe joints and protect the connector threads from the corrosive effects of the sea water when the coupling is accurately positioned on the pins, said coupling threads having threads for mating with the threads on the pins located at opposite ends and means for allowing the coupling to float to the center of the connection to energize the external seals when the pins and lugs are properly aligned and the threads are in phase, said means including indicia on the pins to indicate when the threads on the pins are in phase to insure that the coupling will float to the center of the connector and be accurately positioned to engage the metal-to-metal seals on the coupling and the pins.

6. The connection of claim 5 in which the indicia includes a timing lug on one pin and a timing groove on the other pin that engage when the threads on the pins are in phase.

7. In a threaded pipe connection for connecting two joints of pipe having externally threaded pin ends, one pin having external right-hand threads and the other pins having external left-hand threads, an internally threaded coupling having right and left-hand threads for mating with the threads on the pins, an internal pressure seal ring positioned to provide a seal between the ends of the pins and a plurality of mating lugs and grooves on the ends of the pins to hold the pins from relative rotation when the connection is made up, the improvement comprising an external metal-to-metal seal between each pin and the coupling adjacent each end of the coupling to isolate the threads of the connection from the ambient environment thus sealing off the pipe annulus from external pressure due to hydrostatic head, and means for allowing the coupling to float to the center of the connection to energize the external seals when the pins and lugs are properly aligned and the threads are in phase.

8. The threaded connection of claim 7 in which the means for allowing the coupling to float to the center of the connection includes a timing lug on the end of one of the pin members for mating with a timing groove on the end of the other pin member.

9. The threaded connection of claim 7 in which any point on the threads on one pin is the same distance from the end of the pin as the same corresponding point on the threads on the other pin.

* * * * *